March 8, 1927.
J. H. BOURGON
VENTILATOR
Filed Jan. 20, 1923
1,620,512
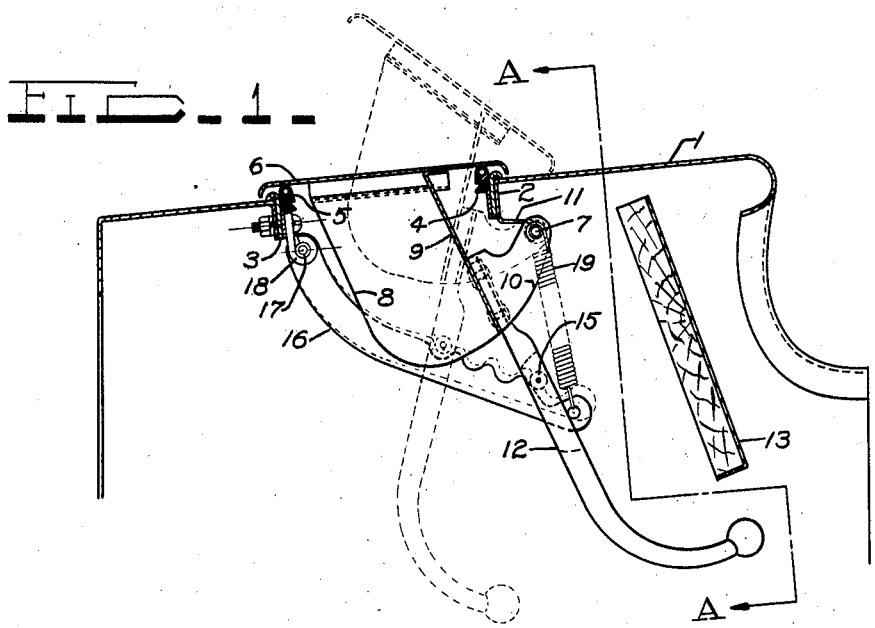
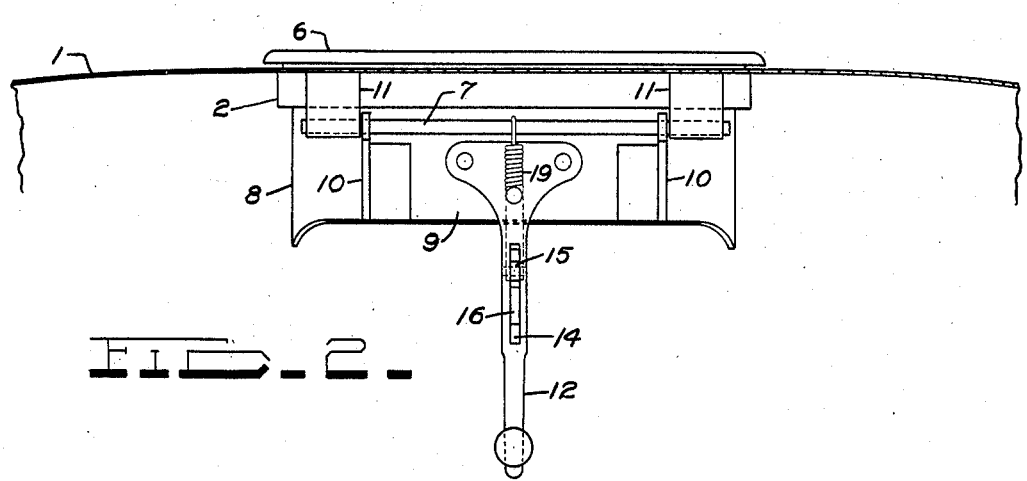
INVENTOR
JOSEPH H. BOURGON
BY
William MacGhshan
ATTORNEY Patented Mar. 8, 1927.

1,620,512

UNITED STATES PATENT OFFICE.

JOSEPH H. BOURGON, OF DETROIT, MICHIGAN, ASSIGNOR TO THE STUDEBAKER CORPORATION, A CORPORATION OF NEW JERSEY.

VENTILATOR.

Application filed January 20, 1923. Serial No. 613,923.

This invention relates to ventilators for automobiles and has for its principal object the providing of a simple, quick and effective means for opening and closing the same.

This device is particularly adaptable for ventilators situated in the cowls of automobiles, for directing cool air towards the feet of those in the driving compartment.

Heretofore it has generally been the custom to operate such ventilators by screw means, which are necessarily relatively slow in operation and costly to manufacture. The slowness of operation is particularly noticeable when it is desired to shut the ventilator momentarily as, for instance, when passing thru a cloud of dust, when close to the exhaust of another automobile, or when in a locality of disagreeable fumes. The driver's attention is also necessarily diverted from the operation of the automobile while engaged in operating the ventilator. I obtain a quick operating ventilator and do away with these screw operating means by fastening a handle or lever member rigidly to the ventilator cover. This lever has a roller fastened thereto at a point some distance from the fulcrum point of the cover. A notched member pivoted to swing in the same plane as the cover lever is held in such a manner that the roller of the cover lever fits into one of the notches and is held there by pressure of a spring. Movement of the cover lever regulates the amount that the ventilator opens and the roller being held in one of the notches of the notched member, holds the ventilator in adjusted position.

Referring to the accompanying drawing which illustrates an embodiment of my invention such as has been described above.

Fig. 1 is a sectional side view of the device and

Fig. 2 is a view taken on the line A—A of Fig. 1.

Like reference numerals refer to similar parts throughout each of the views and referring to the numbered parts of the drawing, 1 is the cowl of an automobile having an opening therein, the metal around the edge of the opening being downwardly turned as at 2 to form a flange to which the ventilator mechanism is attached. Within the opening and fitting against the flange 2 is a frame 3 having a rolled upper edge which forms a finishing strip for the opening. Positioned between the finishing strip 3 and dove-tailed piece 4 is a strip of flexible rubber 5 rising slightly above the edge of the other members and forming a flexible seat for the cover 6 which is hinged on the pintle 7. I prefer to use a cover 6 formed of pressed metal because of its low cost and light weight but other forms may be used with equally good results. A deflector 8 which is substantially U-shaped in horizontal section has outwardly extending flanges at its upper edge by which the deflector 8 is attached to the cover 6. The back or bottom 9 of the deflector 8 is positioned adjacent the rear of the cover 6, and by this arrangement the deflector assists in deflecting the air downwardly as it passes through the opening in the cowl 1. Two ears or hinge members 10 are fastened to the bottom 9 of the deflector 8 and are provided with openings to receive the pintle 7 about which they and the member 8 and cover 6 pivot. The pintle 7 on which the cover 6 pivots is supported by extensions 11 formed on the flange 2, and is secured thereto by rolling the end of the extension around the pintle. Fastened securely to the member 8 is a handle or lever 12, terminating in a ball, which extends downwardly below the instrument board 13. The lever 12 is slotted about midway its length as at 14 and a roller 15 is placed within the slot. A bar or rod having notches in its upper face adjacent its outer end is pivotally supported on the pintle 17 which is mounted in the bracket 18 secured to the flange 2. The outer end of bar 16 extends through the slot 14 formed in the lever 12 beneath the roller 15, and is held in contact with the roller 15 by means of a coiled spring 19 having one end connected to the outer end of the lever and its other end secured to the pintle 7. By this arrangement the notches or depressions formed in the bar 16 are adapted to engage the roller 15, the outer notch being so formed that the cover 6 may be drawn down tightly against the rubber strip 5 when the cover is in closed position, and because of the tension exerted by the spring 19 the same will hold the cover securely in place so that it will not rattle. As the lever 12 is moved forwardly, the roller 15 will engage one of the several notches in the bar 16, the spring 19 serving to hold the roller in engagement with the respective notch in which it rests and thus hold the cover in corresponding open position, as shown in dotted lines in Figure 1. Because of this simplified construction and as there are no slow moving parts, such, for instance, as a screw for operating the cover, the occupant of the automobile can quickly and easily adjust the ventilator cover to any desired position by merely moving the lever forward or backward to regulate the same.

It is thus seen that this construction affords a simplified mechanism, easy and quick to operate, positive in operation, and economical to manufacture.

Although I have shown a ventilator cover and several of its associated parts as being formed of sheet metal, it is evident that they can be made of other materials, and in any suitable manner, and also that formal changes can be made in design and construction without departing from the spirit and scope of my invention which I have defined in the appended claims.

What I claim is:—

1. The combination with the cowl of an automobile having an opening therein, of a hinged cover for said opening, a lever rigidly connected with said cover, and a hinged notched member for resiliently engaging and holding said lever in any one of a plurality of positions.

2. An automobile ventilator comprising an opening in the automobile body, a pivotable cover for said opening, a lever rigidly fastened to said cover, a notched member pivoted about a line other than that about which said cover is pivoted, and spring means for holding said notched member against a part of said lever for holding said lever in adjusted position.

3. In an automobile, a cowl having an opening therein, a cover for said opening, a member secured to and depending from said cover, a pintle mounted within said cowl, means on said member for pivotally mounting said cover on said pintle, an operating handle rigidly mounted on said member for operating said cover, and means co-operating with said operating handle for holding said cover in closed position and a plurality of open positions.

4. In an automobile, a cowl having an opening therein, a cover for said opening, a lever rigidly secured to said cover, a member pivotally mounted in said cowl and adapted to engage said lever, and a spring secured to the free end of said member to hold said member in contact with said lever, said lever being adapted to move longitudinally of said member.

5. In an automobile, a cowl having an opening therein, a cover for said opening, a member having a depending portion attached to said cover, a lever for opening and closing said cover rigidly attached to said member, and means pivotally mounted in said cowl co-operating with said lever to hold said cover in a plurality of adjusted positions.

6. In an automobile, a cowl having an opening therein, a cover for said opening, a lever rigidly secured to said cover, a member having notches formed therein pivotally mounted within said cowl, the notches of which are adapted to engage a portion of said lever, and resilient means for holding said notched portion of said member in engagement with said lever.

7. In an automobile, a cowl having an opening therein, a cover for said opening, a lever rigidly secured to said cover, a roller attached to said lever, a member having notches formed therein pivotally mounted within said cowl, said notches being adapted to engage said roller, and resilient means for holding said member in engagement with said roller.

8. In an automobile, a cowl having an opening therein, a cover for said opening, a member attached to said cover, a lever for opening and closing said cover rigidly attached to said member, a roller attached to said lever, a member pivotally mounted within said cowl and having notches formed therein adjacent its free end, said notches being adapted to engage said roller, and resilient means for holding said last named member in engagement with said roller.

9. In an automobile, a cowl having an opening therein, a pintle mounted in said cowl, a cover for said opening pivoted on said pintle, a member having a portion thereof extending substantially parallel with said pintle secured to said cover, a lever rigidly secured to said member, an arm pivotally mounted in said cowl on the opposite side of the opening from said pintle, said arm being adapted to engage said lever, and resilient means for holding said arm in engagement with said lever.

10. In an automobile, a cowl having an instrument board positioned therein and an opening formed therein forwardly of said instrument board, a hinged cover for said opening, a member having a substantially vertical wall secured to said cover, a lever rigidly secured to the vertical wall of said member and extending downwardly and rearwardly below said instrument board, a roller attached to said lever, a member pivoted at one of its ends within said cowl, and resilient means for holding said member in engagement with said roller.

Signed by me at Detroit, Michigan, U. S. A., this 18th day of Jan., 1923.

JOSEPH H. BOURGON.